United States Patent
Landis

(10) Patent No.: US 6,509,712 B1
(45) Date of Patent: Jan. 21, 2003

(54) VOLTAGE BUS REGULATION CIRCUIT

(76) Inventor: David M. Landis, 2511 Mathews Ave., Unit A, Redondo Beach, CA (US) 90278

( * ) Notice: Subject to any disclaimer, the term of this patent is extended or adjusted under 35 U.S.C. 154(b) by 0 days.

(21) Appl. No.: 09/339,420

(22) Filed: Jun. 24, 1999

(51) Int. Cl.[7] .................................................. H02J 7/00
(52) U.S. Cl. ...................................... 320/101; 323/282
(58) Field of Search ................................. 320/101, 129, 320/127, 128; 323/222, 282

(56) References Cited

U.S. PATENT DOCUMENTS 4,736,151 A * 4/1988 Dishner ....................... 363/101
5,869,948 A * 2/1999 Becker-Irvin ................ 320/101
5,982,160 A * 11/1999 Walters et al. ............... 323/282

* cited by examiner

*Primary Examiner*—Shawn Riley
*Assistant Examiner*—Lawrence Luk

(57) ABSTRACT

A regulating circuit that is coupled to a bus voltage and bus voltage return includes a solar array and a bus voltage limiting circuit electrically coupling the bus to the solar array. A battery is coupled to a battery discharge circuit and a battery charge circuit. The battery discharge circuit and the battery charge circuits are also coupled to the bus. A master bus regulator generates a voltage control signal. The control signal is coupled to the bus voltage limiting circuit, the battery discharge circuit, and the battery charge circuit. The voltage control signal is generated in response to the bus voltage.

19 Claims, 6 Drawing Sheets

OUTPUT RIPPLE WITH 100 AP-P SQUARE WAVE LOAD @ 1.75kHz

VOLTAGE BUS REGULATION CIRCUIT

TECHNICAL FIELD

The present invention relates to space and communications satellites, and more particularly, to regulating voltage of a power bus.

BACKGROUND ART

Many spacecraft use panels of solar cells to power the electrical equipment onboard the spacecraft. Such equipment typically includes communications transponders, sensors, detectors, and data processing equipment. Spacecraft typically include a battery for powering the loads when the spacecraft is out of the sun. Because of variations in power consumption needs of the spacecraft, variations in the amount of power generated by the solar panels and variations in the battery condition, spacecraft regulate the voltage and current on the spacecraft power bus which powers the electrical loads. Commonly, spacecraft bus regulating schemes are intended for relatively constant power loads. When subjected to transient or pulsating bus current loading, poor power quality is obtained. Poor power quality may affect the performance of various spacecraft functions.

It would, therefore, be desirable to accurately control the spacecraft power bus during transient loading.

SUMMARY OF THE INVENTION

The present invention provides bus voltage regulation and very low bus ripple and transients in the presence of large pulsating or transient bus current loading.

In one aspect of the invention, a regulating circuit that is coupled to a bus voltage and bus voltage return includes a solar array and a bus voltage limiting circuit electrically coupling the bus to the solar array. A battery is coupled to a battery discharge circuit and a battery charge circuit. The battery discharge circuit and the battery charge circuits are also coupled to the bus. A master bus regulator generates a voltage control signal. The control signal is coupled to the bus voltage limiting circuit, the battery discharge circuit, and the battery charge circuit. The voltage control signal is generated in response to the bus voltage.

In a further aspect of the invention, the master bus regulator may include an energy storage capacitor and a bi-directional DC to DC converter. Through the bi-directional DC to DC converter, the energy storage capacitor absorbs or provides transient energy.

In a further aspect of the invention, a method for regulating a voltage of a battery bus comprises the steps of coupling said battery charge current controller, the battery discharge controller, and the bus voltage limiter to the bus, generating a control voltage in response to a bus voltage, controlling a battery charge current controller, a battery discharge controller, and a bus voltage limiter in response to said control voltage, and regulating the bus voltage in response to the operation of the battery charge current controller, a battery discharge controller, and a bus voltage limiter.

One advantage of the invention is that ripple voltage resulting from large transient and pulsating bus current loading is minimized while maintaining tight DC regulation of the spacecraft bus.

Other objects and features of the present invention will become apparent when viewed in light of the detailed description of the preferred embodiment when taken in conjunction with the attached drawings and appended claims.

BEST MODE(s) FOR CARRYING OUT THE INVENTION

Figure 1:
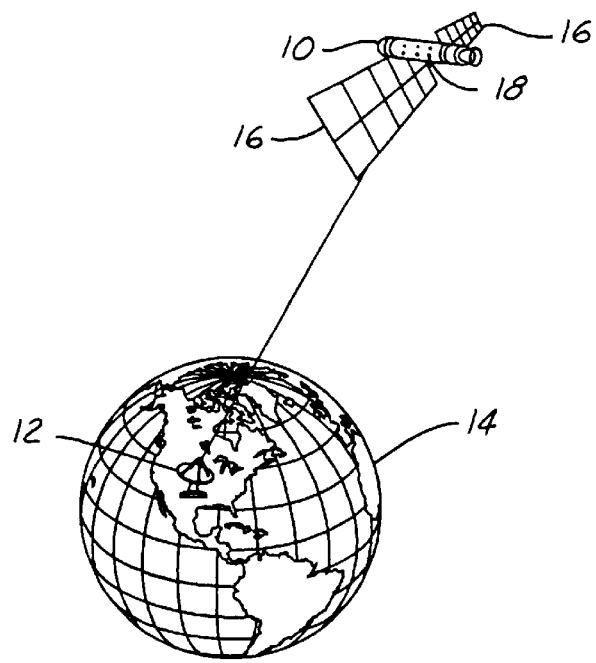
FIG. 1 is a view of a satellite in the deployed configuration in which the present invention is applicable.

Referring now to the drawings, like reference numerals are used to identify identical components in the various views. While the present invention is illustrated with respect to a satellite, the teachings may apply equally to other applications such as electric or solar powered automobiles.

Referring now to FIG. 1, a satellite 10 communicates with a ground station 12 on earth 14. Satellite 10 has a solar array 16 that is used to generate power for the operation of satellite 10. Solar array 16 is coupled to control circuitry 18 located within satellite 10. Control circuitry 18 controls the command, control, and tracking capabilities of satellite 10. Control circuitry 18 may include a spacecraft bus and a spacecraft bus voltage regulating circuit as will be further described below.

Figure 2:
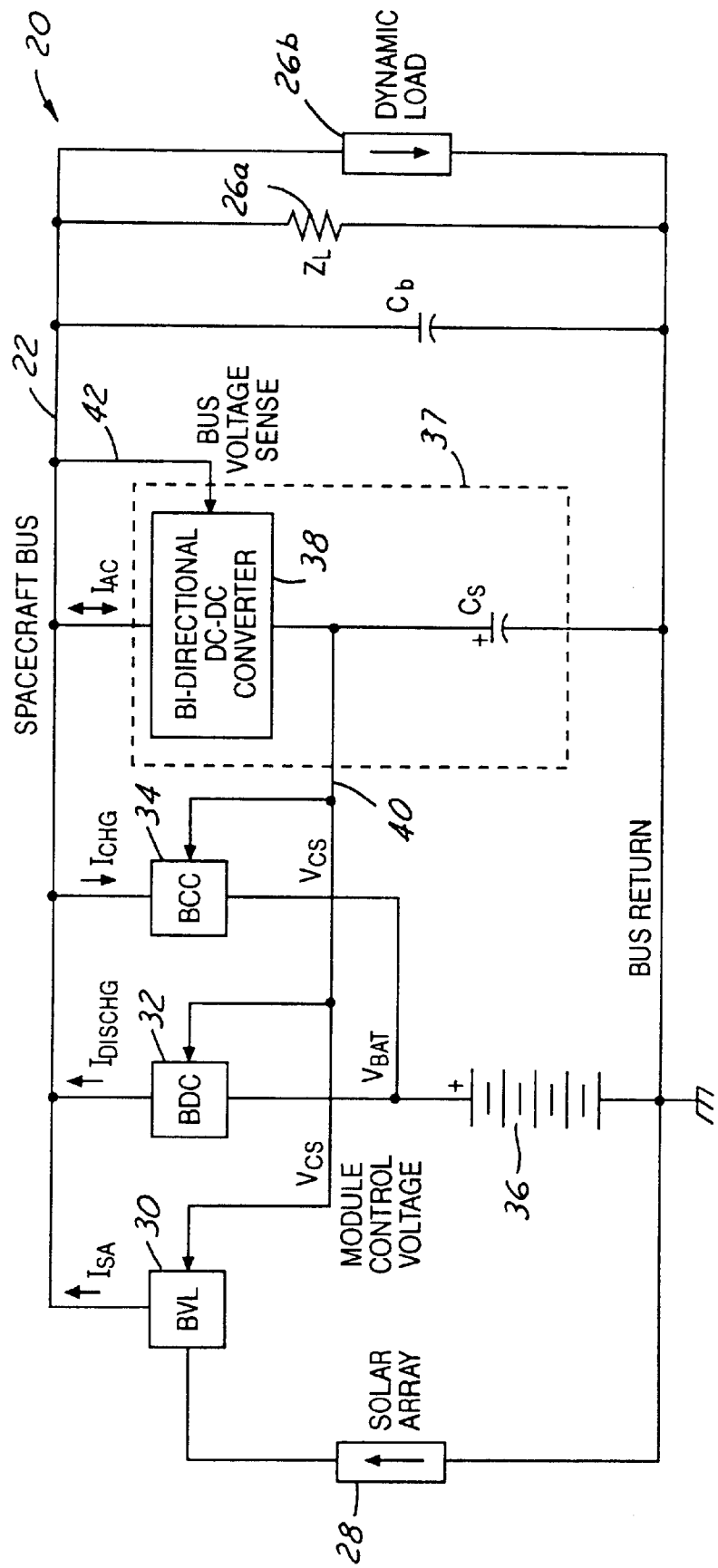
FIG. 2 is a schematic diagram of a voltage regulating circuit according to the present invention.

Referring now to FIG. 2, a bus regulating circuit 20 is coupled to a spacecraft bus 22 and a bus return 24. Spacecraft bus 22 provides power to a static load 26a and dynamic load 26. Bus return 24 provides a common or ground circuit connection to load 26a and load 26b. Static load 26a and 26b may be of any type, including but not limited to, resistive, constant current or constant power, pulsating, or transient.

A solar array 28 is coupled to bus return 24. Solar array 28 may be of a type commonly used in communication satellites. Solar array 28 may, for example, be divided into a set of independent circuits or strings of solar cells (not shown). The strings of solar array 28 are coupled to a bus voltage limiting circuit 30 which is preferably capable of individually shunting each string independently to ground using internal switches. Accordingly, any one or more of the solar cell strings may be isolated from the spacecraft bus to control the power supply to the spacecraft bus. In a conventional spacecraft, each and every one of the solar cell strings on each and every panel can be independently shunted. Suitable bus voltage limiting circuits 30 are well known in the art.

A battery discharge controller 32 and battery charge controller 34 are coupled to spacecraft bus 22. Battery discharge controller provides a current $I_{DISCHG}$ to spacecraft bus. Battery charge controller 34 removes a current $I_{CHG}$ from spacecraft bus 22.

A battery 36 is coupled to bus return 24. Battery discharge control circuit 32 and battery charge control circuit 34 are coupled to the positive terminal of battery 36. Battery 36 may, for example, be a nickel-hydrogen, nickel-cadmium, sodium-sulfur, or any of a variety of batteries as are known in the art.

A high frequency bus filter capacitor $C_b$ may also be coupled between spacecraft bus 22 and bus return 24. Capacitor $C_b$ provides passive bus impedance control for high frequency load emissions above the bandwidth of master bus regulator circuit 36.

A master bus regulator circuit 37 is also coupled between spacecraft bus 22 and bus return 24. Master bus regulator circuit 37 removes and draws a current $I_{AC}$ to and from spacecraft bus 22. Master bus regulator circuit 36 has a bi-directional direct current to direct current (DC/DC) converter 38 and an energy storage capacitor $C_s$. A common node 40 between bi-directional DC/DC converter 38 and energy storage capacitor $C_s$ is coupled to battery voltage limiting circuit 30, battery discharge circuit 32, and battery charge circuit 34. The voltage associated with node 40 is $V_{cs}$ which is the voltage across capacitor $C_s$. As will be further described below, the voltage of node 40 is used to control the operation of battery voltage limiting circuit 30, battery discharge circuit 32, and battery charge circuit 34.

DC/DC converter 38 is preferably a wide bandwidth bi-directional peak current mode controlled DC/DC converter. The optimum size for the energy storage capacitor is a function of the magnitude of the transient load current and the bandwidth of the power bus modules. Since the energy stored in the capacitor is proportional to the square of the capacitor voltage, the operational range should be maintained close to the bus voltage. In the following example, the upper 30 percent of the bus voltage range was selected. The upper 30 percent provides sufficient range to easily accommodate the control voltage range required for the bus power modules, provides adequate voltage range for transient energy storage, and minimizes constraints on the design of the bi-directional converter. The voltage range selected for the energy storage capacitor in the following example is from 70 to 95 volts for a 100 volt DC 15 kW spacecraft bus. While bi-directional DC/DC converter 38 is shown having a separate bus voltage sense line 42, in practice only a single electrical connection to bus 22 may be required.

Figure 3A:
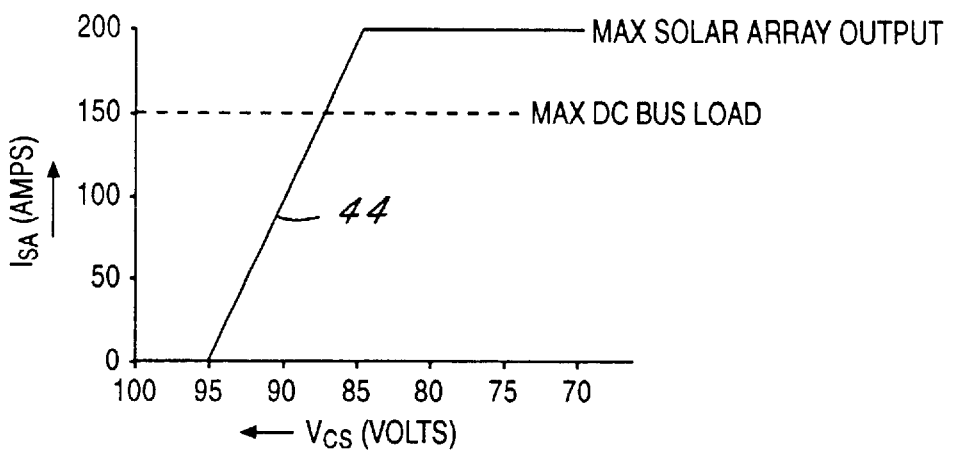
FIG. 3A is a plot of current versus control voltage for a bus voltage limiter.

Referring now to FIG. 3A, a maximum DC bus load of 150 amps is presumed. The control voltage range as represented by line 44 of battery voltage limiting circuit is illustrated. As shown, the control range is between 85 and 95 volts.

Figure 3B:
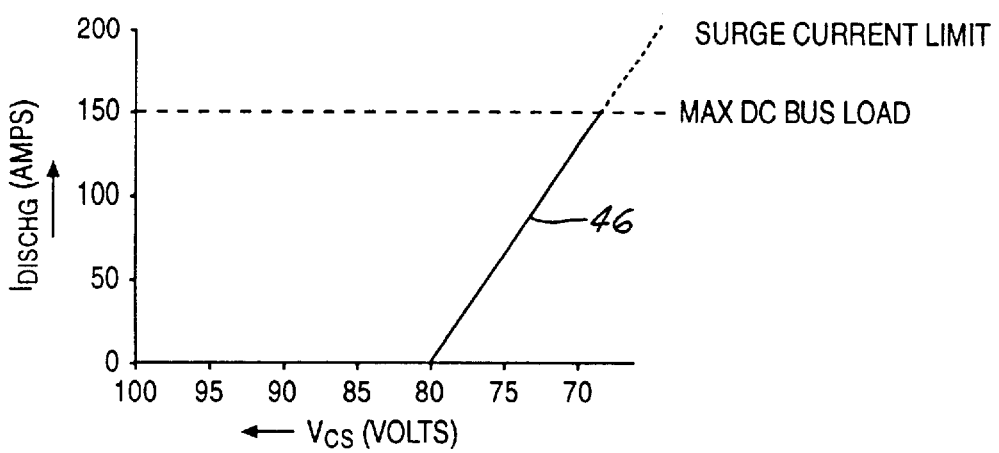
FIG. 3B is a current versus control voltage plot of a battery discharge controller.

Referring now to FIG. 3B, the control range of the battery discharge control circuit is represented by line 46. Battery discharge control range in this example is between 70 and 80 volts.

Figure 3C:
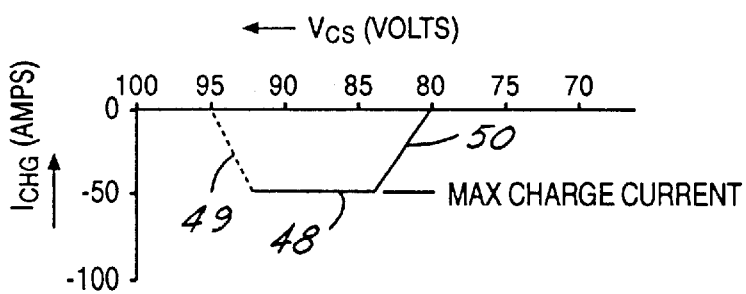
FIG. 3C is a plot of current versus control voltage for a battery charge controller.

Referring now to FIG. 3C, the control range of battery charge control circuit is illustrated by line 48. Line 48 has a region limited by the battery voltage limiting circuit represented by line 49 and a charge reduction region 50. The control range for battery charge control circuit is between 80 and 85 volts.

Figure 4:
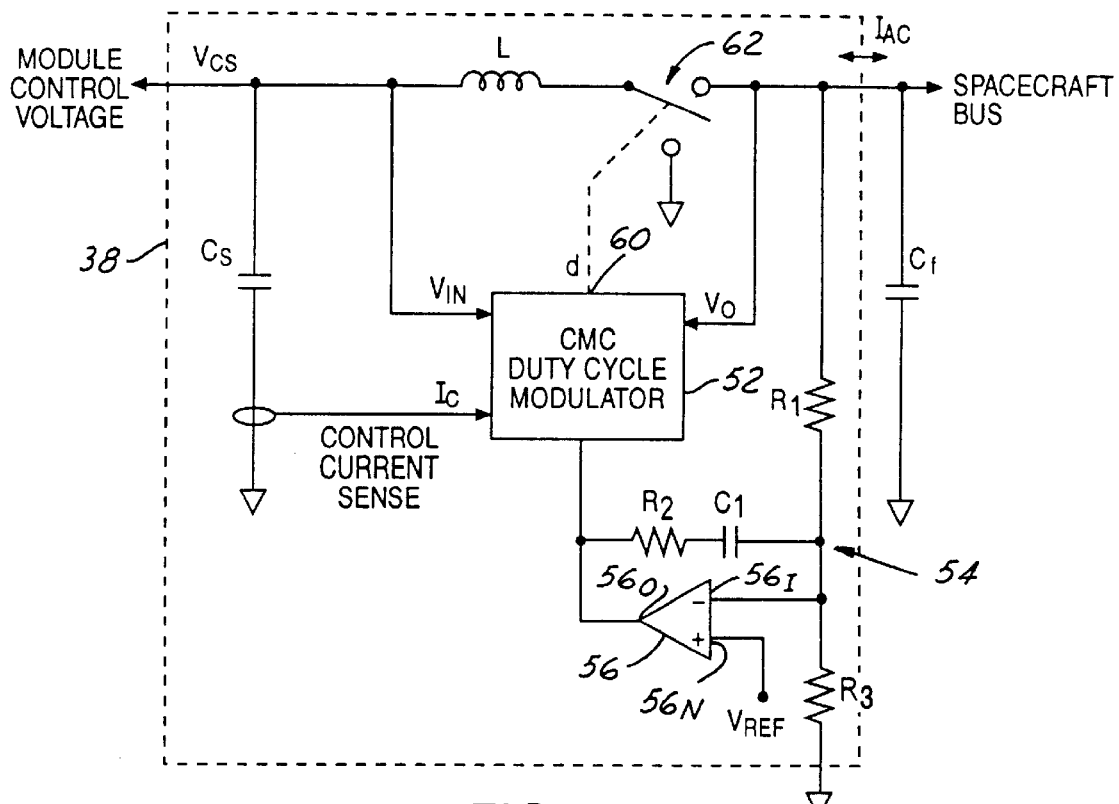
FIG. 4 is a schematic diagram of the bi-directional converter shown in FIG. 2.

Referring now to FIG. 4, the DC/DC converter 38 of FIG. 2 is shown in more detail. DC/DC converter 38 has a duty cycle modulator 52. Duty cycle modulator 52 is preferably a peak current mode control (CMC) type converter. This allows a single control loop to control the two directions of current $I_{AC}$. The CMC converter allows the desired bandwidth to be achieved. Of course, other control topology such as a coupled inductor may be selected for bi-directional converter 38. Of course, multiple converters may be used to further minimize ripple current. Duty cycle modulator 52 may be coupled to a comparator circuit 54. Comparator circuit 54 may include an operational amplifier 56 and a plurality of resistors, R1, R2, and R3, and a capacitor C1 that may form a voltage compensation circuit coupled to an inverting input $56_I$ of operational amplifier 56. A reference voltage $V_{REF}$ may be coupled to non-inverting input 56 and of operational amplifier 56. An output $56_O$ of operational amplifier 56 is coupled to duty cycle modulator 52. Comparator circuit 54 allows duty cycle modulator to monitor the spacecraft bus voltage. DC/DC converter 38 has an inductor L as well as a sensing input $V_{IN}$ and $V_O$. Duty cycle modulator 52, through an output 60, controls the voltage $V_{cs}$. Switch 62 couples the control voltage $V_{cs}$ between the spacecraft bus voltage and ground. Switch 62 may, for example, be implemented as a power MOSFET.

Duty cycle modulator 52 may also have a control current sensing input $I_c$ to monitor the current at capacitor $C_s$.

Figure 5:
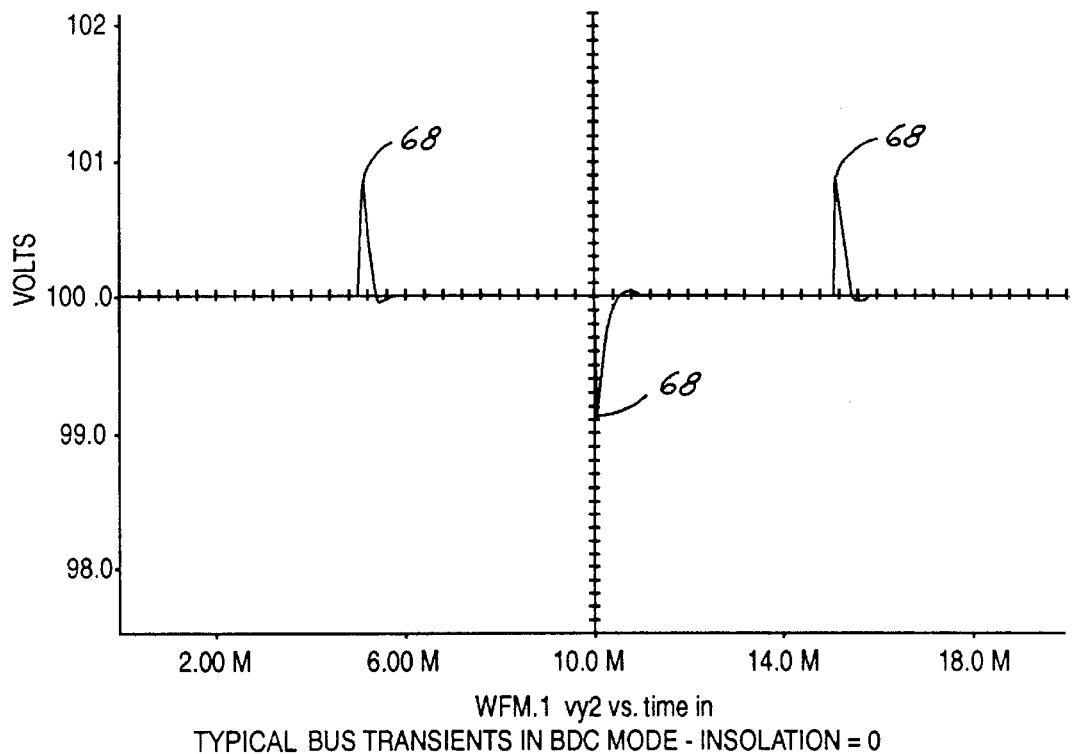
FIG. 5 is a plot of typical bus transients generated during battery discharge mode.

Referring now to FIG. 5, the operation of battery discharge control circuit is best described by example. In the present example, the maximum solar array current available during insolation is 200 amperes which provides up to 150 amperes DC load current and 50 amperes for battery charging. In the present example, 100 ampere peak square wave current source was used to modulate the load between 50 and 150 amperes.

Node 40 (FIG. 2) is coupled to battery voltage limiter 30, battery discharge circuit 32 and battery charge circuit 34. Therefore, as the voltage at node 40 drops, battery discharge adds current to bus 22. When the voltage of node 40 increases, battery charge circuit 34 removes current from bus 22 and charges battery 36.

FIG. 5 shows typical bus transients generated during eclipse (BDC mode) with a 100 hertz, 100 ampere square wave load for the present design example. As shown, various transient peaks 68 occur at various times during BDC mode.

Figure 6:
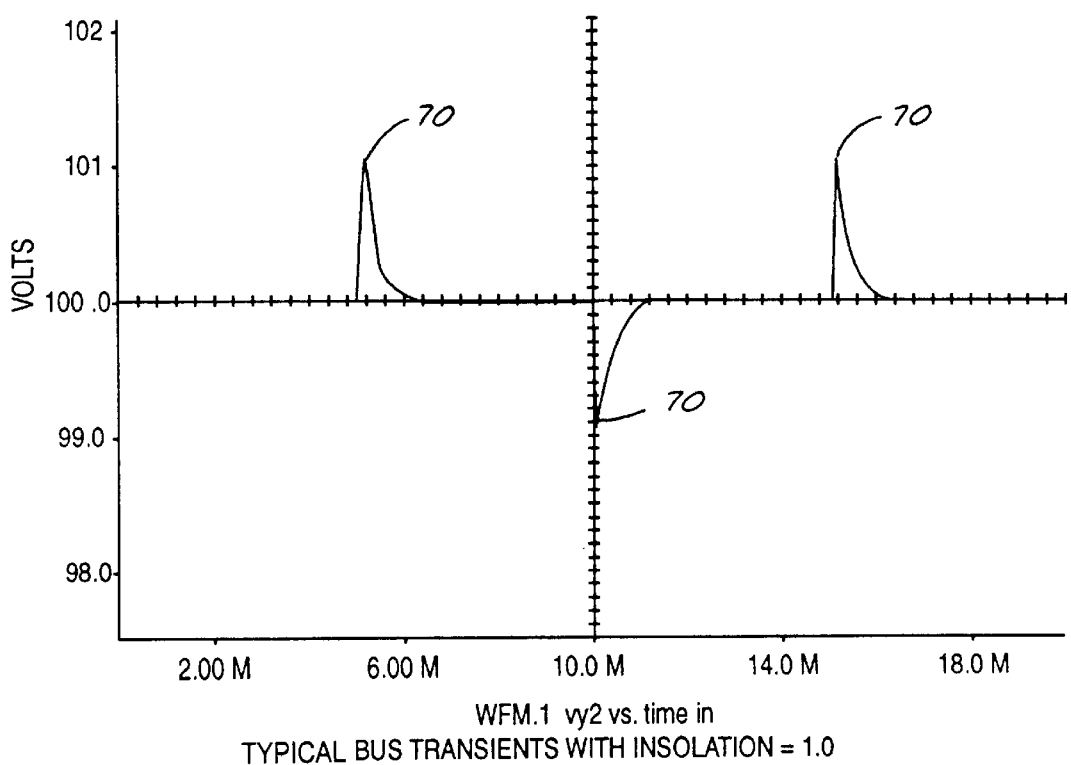
FIG. 6 is a plot showing voltage transients for full sun mode.

Referring now to FIG. 6, various typical peaks 70 are shown in full sun (BVL mode). When the pulsating load is at its peak value of 150 amperes, the BVL circuit provides it maximum 100 amperes and the BDC circuit provides the 50 ampere difference. When the pulsating load is at a minimum value of 50 amperes, the BDC cuts off, and the BVL provides the 50 amperes load, and up to 50 amperes battery charge current.

Figure 7:
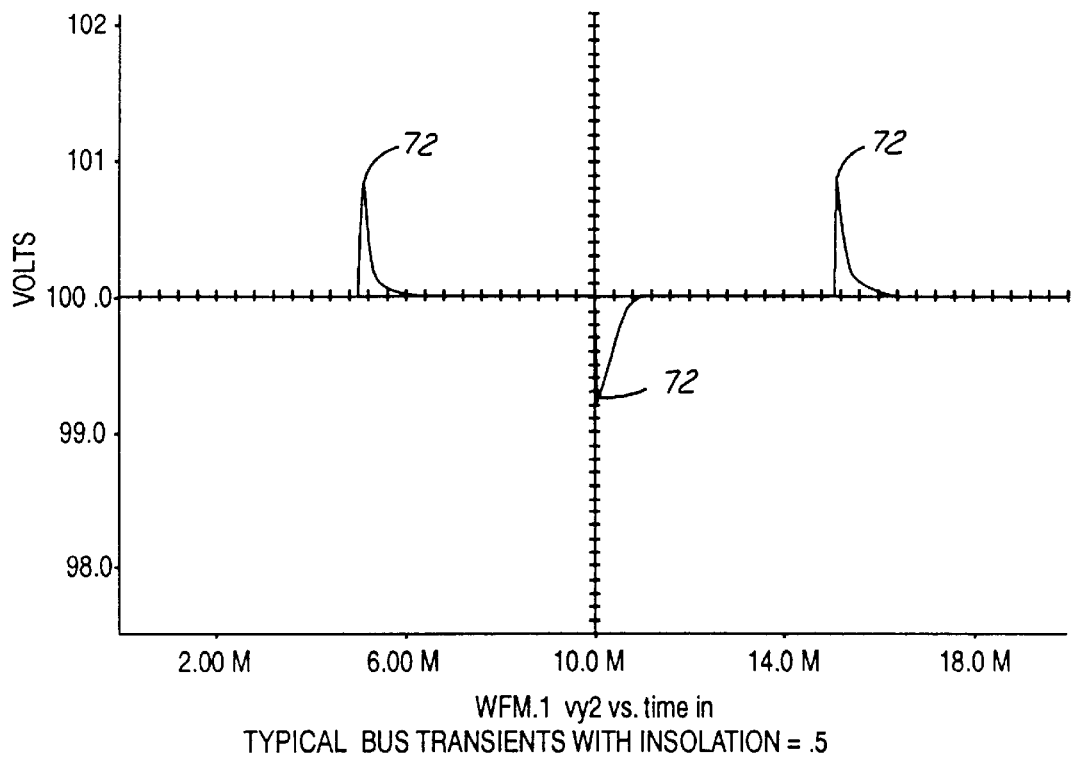
FIG. 7 is a plot of bus transients from a battery voltage limiting to battery discharge controller transition.

Referring now to FIG. 7, various typical bus transient peaks 72 are shown with an insolation level of 0.5.

Figure 8:
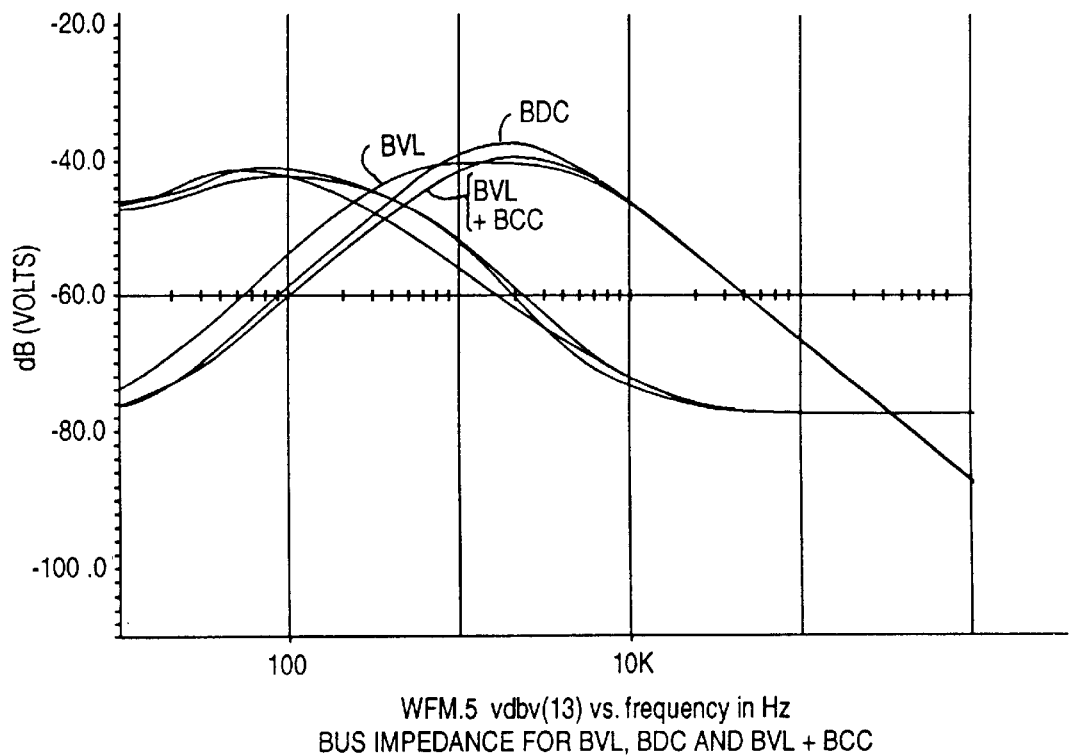
FIG. 8 is the bus impedance for battery voltage limiting mode, battery discharge controller mode, and battery charge controller mode.

Referring now to FIG. 8, bus impedance is shown for BVL, BDC, and BVL+BVC modes.

Figure 9:
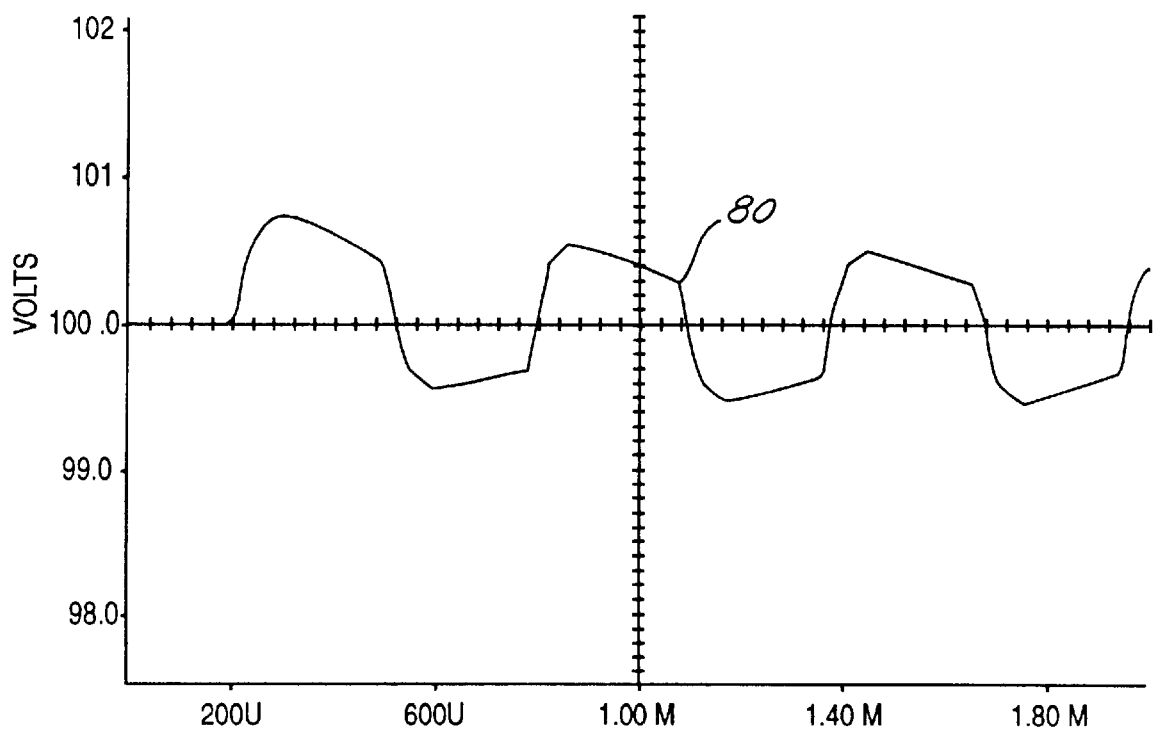
FIG. 9 is a plot of ripple voltage generating during mode transitions.

Referring now to FIG. 9, a typical bus ripple voltage signal 80 is generated during mode transitions when the 100 ampere square wave load frequency is increased to 1.7 KHz where the bus impedance is near its maximum value.

While particular embodiments of the invention have been shown and described, numerous variations and alternate embodiments will occur to those skilled in the art. Accordingly, it is intended that the invention be limited only in terms of the appended claims.

What is claimed is:

1. A regulating circuit for coupling to a voltage bus comprising:

a solar array;

a bus voltage limiting circuit electrically coupling said bus to said solar array;

a battery;

a battery discharge circuit electrically coupled to said bus and said battery;

a battery charge circuit electrically coupled to said bus and said battery;

a load coupled to said bus; and a master bus regulator generating a voltage control signal, said control signal coupled to said bus voltage limiting circuit, said battery discharge circuit, said battery charge circuit, said voltage control signal generated in response to a bus voltage.

2. A regulating circuit as recited in claim 1 wherein said master bus regulator comprises a bi-directional DC to DC converter.

3. A regulating circuit as recited in claim 1 wherein said bi-directional converter comprises a duty cycle modulator.

4. A regulating circuit as recited in claim 3 wherein said duty cycle modulator comprises a peak current mode control duty cycle modulator.

5. A regulating circuit as recited in claim 1 wherein said bi-directional converter is a current mode control type converter.

6. A satellite system comprising:

a ground station; and a satellite having a battery;

a bus;

a load coupled to said bus; and a control circuit, said control circuit having
   a battery discharge circuit electrically coupled to said bus and said battery;
   a battery charge circuit electrically coupled to said bus and said battery; and a master bus regulator generating a voltage control signal, said control signal coupled to said bus voltage limiting circuit, said battery discharge circuit, said battery charge circuit, said voltage control signal generated in response to a bus voltage.

7. A satellite system as recited in claim 6 further comprising a solar array; and a bus voltage limiting circuit electrically coupling said bus to said solar array.

8. A satellite system as recited in claim 6 further comprising an inductive circuit coupled between said energy storage capacitor and said switch.

9. A satellite system as recited in claim 6 wherein said master bus regulator comprises a bi-directional converter.

10. A satellite system as recited in claim 9 wherein said bi-directional converter comprises a duty cycle modulator.

11. A satellite system as recited in claim 10 wherein said duty cycle modulator comprises a peak current mode control duty cycle modulator.

12. A satellite system as recited in claim 9 wherein said bi-directional converter comprises a current mode control type converter.

13. A method for regulating a voltage of a battery bus comprising the steps of:

coupling said battery charge current controller, the battery discharge controller, and the bus voltage limiter to the bus;

generating a control voltage in response to a bus voltage;

controlling a battery charge current controller, a battery discharge controller, and a bus voltage limiter in response to said control voltage; and regulating the bus voltage in response to the operation of the battery charge current controller, a battery discharge controller, and a bus voltage limiter.

14. A method of regulating as recited in claim 13 further comprising the step of maintaining the control voltage within a predetermined range.

15. A method of regulating as recited in claim 13 wherein the step of generating a control voltage comprises discharging the energy storage capacitor through a bi-directional converter.

16. A method of regulating as recited in claim 13 wherein the step of generating a control voltage comprises charging the energy storage capacitor through a bi-directional converter.

17. A method of regulating as recited in claim 13 wherein the step of maintaining a control voltage comprises the step of modulating the control voltage.

18. A method of regulating as recited in claim 13 wherein the step of modulating a switch between ground and the bus voltage.

19. A method of regulating as recited in claim 13 wherein the step of regulating the bus voltage comprises the step of increasing a current through the bi-directional converter and decreasing a battery charge.

* * * * *